United States Patent
Matsumiya

[11] Patent Number: 5,722,726
[45] Date of Patent: Mar. 3, 1998

[54] PASSENGER SEAT

[75] Inventor: James Akira Matsumiya, Gerrards Cross, England

[73] Assignee: Britax Rumbold Limited, Warwick, England

[21] Appl. No.: 590,628

[22] Filed: Jan. 24, 1996

[30] Foreign Application Priority Data

Jan. 27, 1995 [GB] United Kingdom ............ 9501603
Feb. 21, 1995 [GB] United Kingdom ............ 9503329

[51] Int. Cl.⁶ .................... A47C 1/02; B60N 2/02
[52] U.S. Cl. ............... 297/322; 297/318; 297/341
[58] Field of Search ................... 297/322, 340, 297/341, 316, 317, 318, 284.1, 284.11, 452.25, 312

[56] References Cited

U.S. PATENT DOCUMENTS

| | | | |
|---|---|---|---|
| 2,611,420 | 9/1952 | Diehl | 297/318 |
| 3,446,532 | 5/1969 | Cramer | 297/312 |
| 3,833,257 | 9/1974 | Dove | 297/284.1 |
| 3,883,173 | 5/1975 | Shephard et al. | 297/284.1 |
| 4,264,103 | 4/1981 | Peresada et al. | |
| 4,717,203 | 1/1988 | Meiller | 297/312 |
| 5,058,954 | 10/1991 | Kan-Chee | |
| 5,536,067 | 7/1996 | Pinto | 297/312 |

FOREIGN PATENT DOCUMENTS

| | | | |
|---|---|---|---|
| 0 302 427 | 2/1989 | European Pat. Off. | |
| 0 639 479 | 2/1995 | European Pat. Off. | |
| 2 424 167 | 11/1979 | France | |
| 2556025 | 6/1977 | Germany | 297/452.25 |
| 29 33 160 | 2/1981 | Germany | |
| 86 14 587 | 7/1986 | Germany | |
| 470122 | 8/1937 | United Kingdom | 297/317 |

*Primary Examiner*—Milton Nelson, Jr.
*Assistant Examiner*—Anthony D. Barfield
*Attorney, Agent, or Firm*—Davis and Bujold

[57] ABSTRACT

A vehicle seat, such as an aircraft passenger seat, has a seat back which is reclinable from a normal substantially vertical orientation, and a seat pan which is tiltable between a normal substantially horizontal orientation and a tilted orientation in which its front edge is lower than its rear edge. The seat pan has a rear portion adjacent to the seat back which is substantially horizontal when the main portion of the seat pan is in its tilted orientation.

3 Claims, 3 Drawing Sheets

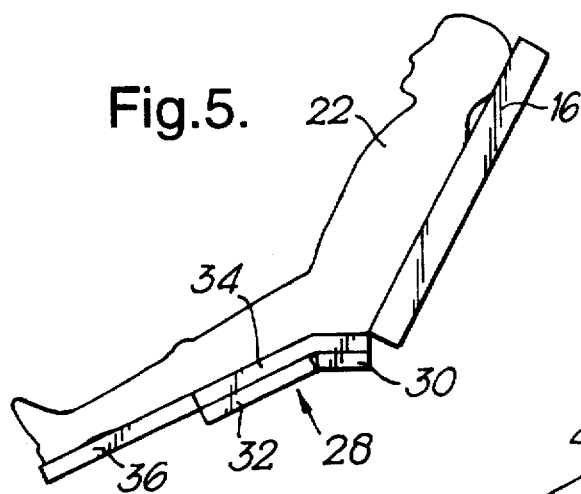
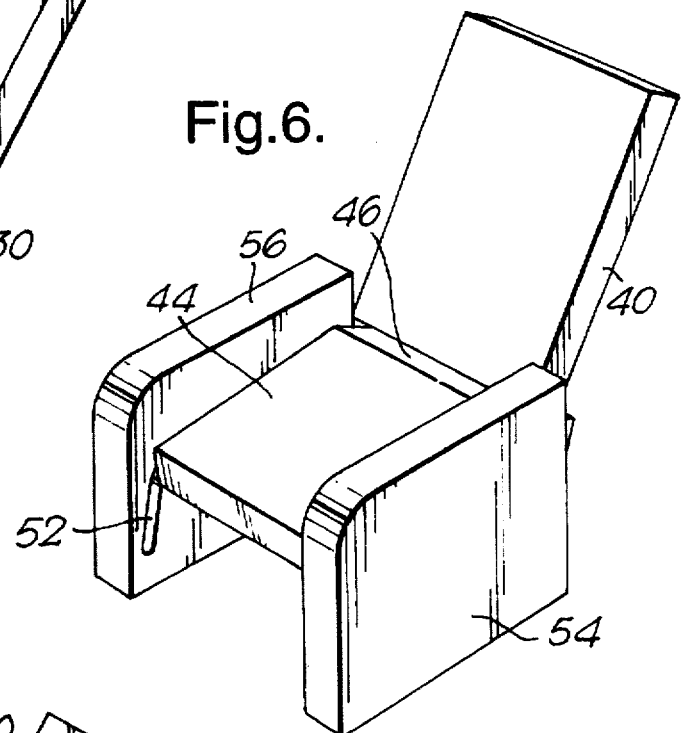
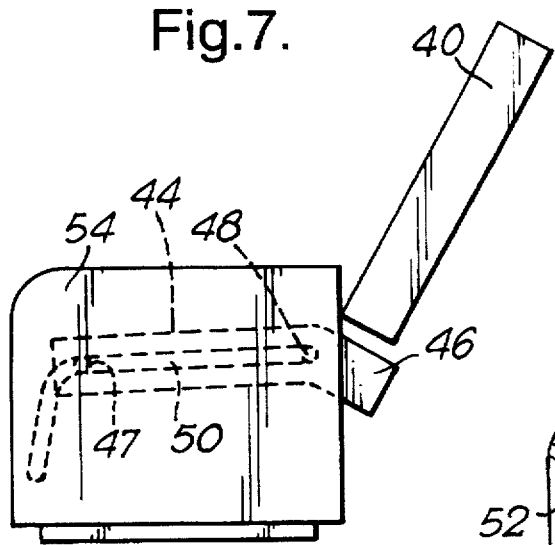
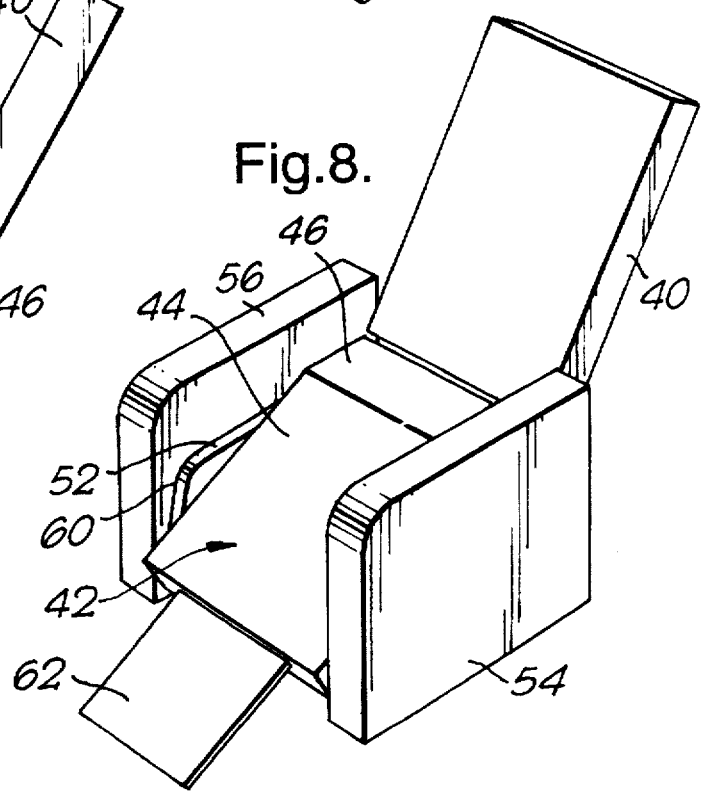

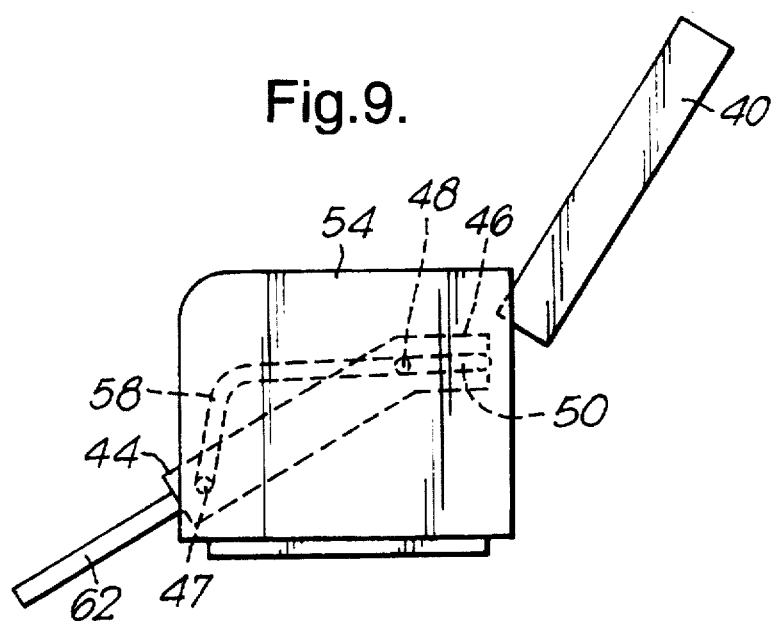
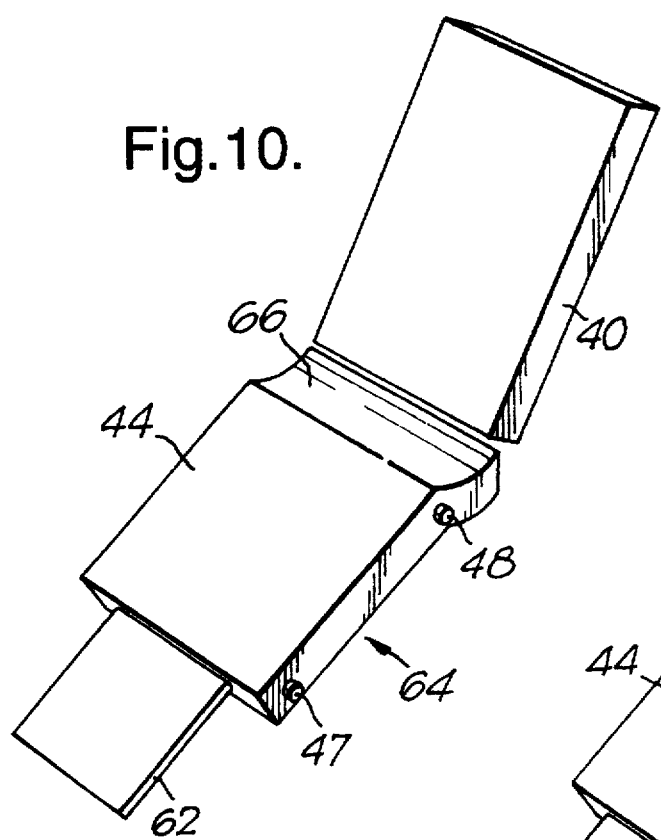
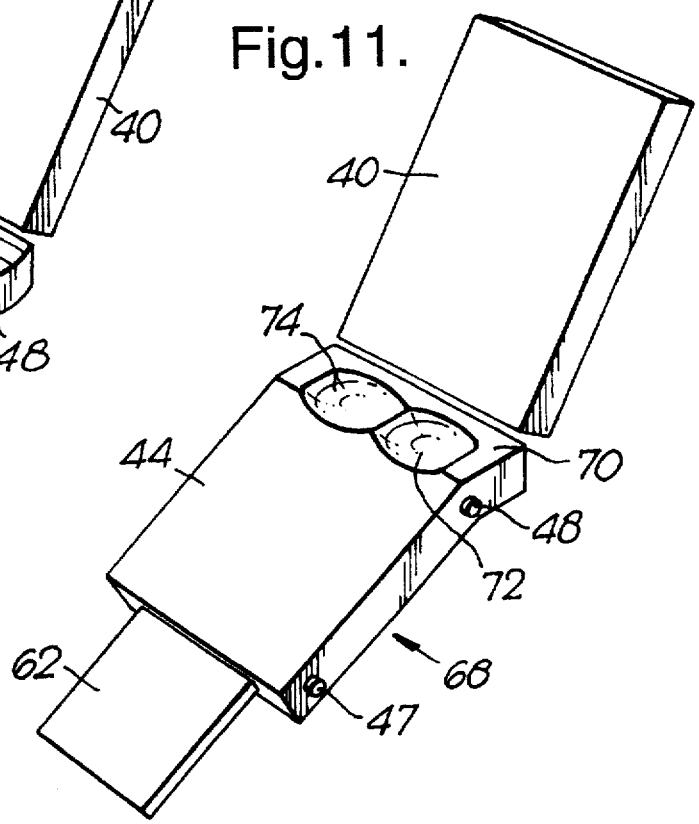

5,722,726

1
PASSENGER SEAT

FIELD

This invention relates to a vehicle seat of the type having a seat back which is reclinable from a normal substantially vertical orientation, and a seat pan which is tiltable between a normal substantially horizontal orientation and a tilted orientation in which its front edge is lower than its rear edge.

RELATED ART

A seat of this type is disclosed in U.S. Pat. No. 5,058,954. Because of the restricted pitch between successive rows of aircraft seats, it is not feasible to lower the seat back sufficiently for the aforesaid substantially continuous surface to be horizontal. When sleeping on a surface which slopes from head to foot there is a risk of a seat occupant tending to slip or wiggle down the slope while asleep. It is an object of the invention to provide a vehicle seat in which this disadvantage is reduced.

SUMMARY OF THE INVENTION

According to the invention, the seat pan of a vehicle seat of the type described above has a rear portion adjacent to the seat back which is substantially horizontal when the main portion of the seat pan is in its tilted orientation.

In one form of the invention, the orientation of the rear portion of the seat pan is permanently fixed in its substantially horizontal orientation and the main portion is pivotable relative to the rear portion.

In another form of the invention, the rear portion of the seat pan is permanently fixed to the main portion and is stowed under the backrest when the main portion is horizontal.

BRIEF DESCRIPTION OF THE DRAWINGS

FIG. 5 is a schematic longitudinal cross-sectional view of the seat shown in FIG. 4;

FIG. 6 is a schematic perspective view of an aircraft passenger seat in accordance a second embodiment of the invention, in its upright orientation;

FIG. 7 is a side view of the seat pan and the seat back of the seat shown in FIG. 6;

FIG. 8 is a perspective view of the sleeper seat shown in FIG. 6, with its leg rest raised, its seat back inclined and its pan tilted;

FIG. 9 is a side view of the seat pan and the seat back of the seat shown in FIG. 8;

FIG. 10 is a schematic perspective view of the seat pan and the seat back of an aircraft passenger seat in accordance a third embodiment of the invention, with its leg rest raised, its seat back inclined and its seat pan tilted; and FIG. 11 is a schematic perspective view, similar to FIG. 10, of an aircraft passenger seat in accordance a fourth embodiment of the invention, with its leg rest raised, its seat back inclined and its seat pan tilted.

2

DETAILED DESCRIPTION OF THE PREFERRED EMBODIMENTS

Figure 1:
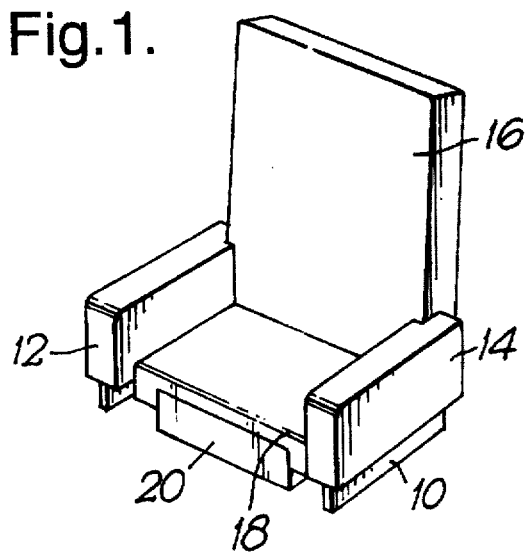
FIG. 1 is perspective view of a sleeper seat, in accordance with a known aircraft passenger seat, in its upright orientation.
Figure 2:
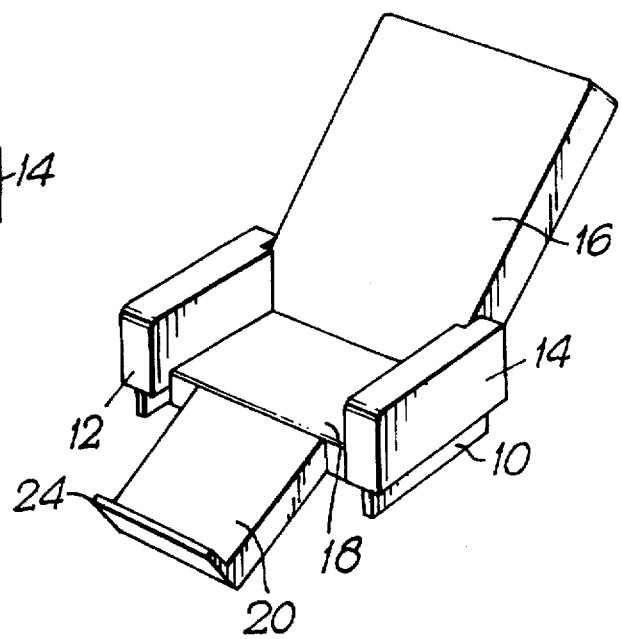
FIG. 2 is a perspective view of the sleeper seat shown in FIG. 1 with its leg rest raised, its seat back inclined and its pan tilted.
Figure 3:
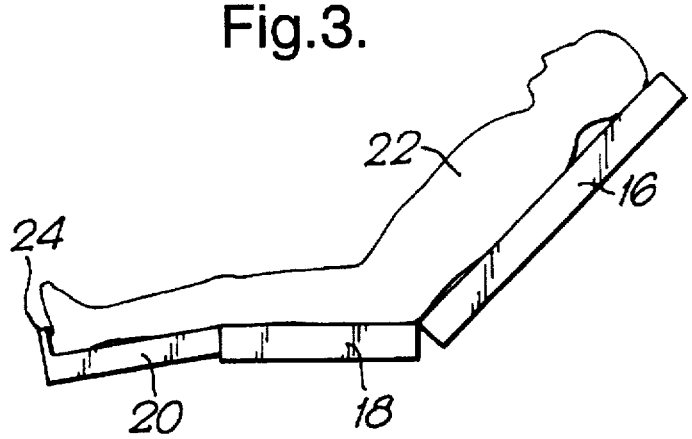
FIG. 3 is a schematic longitudinal cross-sectional view of the seat shown in FIG. 2.

FIG. 1 shows a known aircraft seat. The seat comprises a base frame 10, whereby it may be secured in place in an aircraft. Armrests 12 and 14 are rigidly secured to the frame 10. A seat back 16 is pivotally secured to the frame 10 for angular movement about a horizontal transverse axis near its bottom edge between an upright orientation as shown in FIG. 1 and a reclined orientation as shown in FIGS. 2 and 3. A seat pan 18 is also mounted on the frame 10 and has, secured to its front edge, a leg rest 20 which is movable between a stowed position, as shown in FIG. 1, and a deployed position, as shown in FIGS. 2 and 3. The seat pan 18 is pivotally mounted for angular movement about a transverse axis near its rear edge between a generally horizontal orientation, as shown in FIG. 1, and an inclined orientation, as shown in FIGS. 2 and 3.

When the seat is in the reclined condition shown in FIGS. 2 and 3, there is a risk that the buttocks of a seat occupant 22 will slide down the inclined seat pan 18. To prevent this, it has been proposed to provide an upwardly projecting foot stop 24 on the outer end of the leg rest 20. This arrangement has two disadvantages. Firstly, unless the length of the leg rest 20 is adjustable, a seat occupant whose leg length differs from that of the occupant 22 shown in FIG. 3 will not be able to position his torso correctly in relation to the seat back 16 when his feet are resting on the foot stop 24. Secondly, even for an occupant of the correct leg length, such as the occupant 22, there will be pressure on his feet and tension in his leg muscles while he is asleep.

Figure 4:
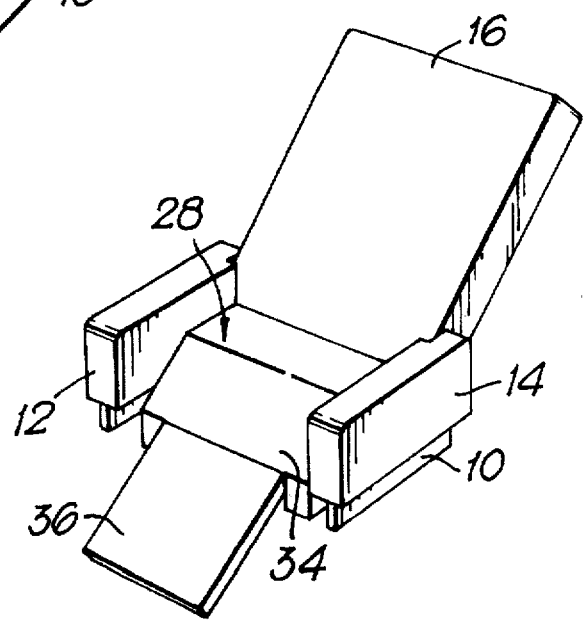
FIG. 4 is a perspective view, similar to FIG. 2, of an aircraft passenger seat in accordance a first embodiment of with the invention.

FIGS. 4 and 5 illustrate a seat in accordance with a first embodiment of the invention which is similar to the seat shown in FIGS. 1 to 3 in that it has a base frame 10, armrests 12 and 14, and a seat back 16. The mechanism for reclining the seat back 16 is conventional and is not described herein.

The seat pan 28 is formed in two portions, namely a rear portion 30 which remains stationary in relation to base frame 10 and a main portion 32 which can pivot to an inclined position in which its front edge is lower than its rear edge. The two seat pan portions 30 and 32 are covered by a single bendable cushion 34. The leg rest 20 of FIGS. 1 to 3 is replaced by a leg rest 36 which does not have a foot stop similar to the foot stop 24.

The length (in the longitudinal direction of the seat) of the rear portion 30 of the seat pan is preferably about half the length of the main portion 32. With this configuration, the buttocks of the occupant 20 can rest comfortably on the horizontal rear portion 30 when the seat is its reclined position as shown in FIGS. 4 and 5.

FIGS. 6 to 9 illustrate an alternative aircraft passenger seat having a seat back 40 which is movable between an upright orientation as shown in FIGS. 6 and 7 and a reclined orientation as shown in FIG. 9, in a similar manner to the seat back 16 of FIGS. 1 to 5. In FIGS. 6 to 9, the seat has a seat pan 42 comprising a main portion 44, together with a rear portion 46 which slopes downwardly and rearwardly relative to the main portion 44 and projects at least partially below the bottom of the seat back 40 when the seat is in its upright configuration, as shown in FIGS. 6 and 7. The seat pan 42 is supported at each side on laterally projecting front and rear guide pins 47 and 48 which engage in L-shaped guide slots 50 and 52 in each of the armrests 54 and 56. The outer cover of the arm rest 52 is omitted from FIGS. 7 and 9 so as to show the slot 50.

When the seat is to be put into its reclined configuration, the seat back 40 is reclined as described above. The seat pan 42 slides forwardly to bring its front guide pins 47 into downwardly extending front end sections 58 and 60 of the slots 50 and 52. The rear portion 46 of the seat pan 42 is thus positioned in front of the bottom of the seat back 40 with its upper surface horizontal. The main portion 44 of the seat pan 42 is therefore in a downwardly sloping orientation, as shown in FIGS. 8 and 9. A leg rest 66 is deployed so as to form a continuation of the top surface of the main portion 44 of the seat pan. The buttocks of a seat occupant can then rest on the rear portion 46.

FIG. 10 illustrates a modification of the seat shown in FIGS. 6 and 9 in which the seat pan 42 is replaced by a seat pan 64 having a rear portion 66 with a concave upper surface in place of the flat upper surface of the rear portion 46 described previously. This further reduces the possibility of a seat occupant sliding down the seat when asleep.

FIG. 11 illustrates an alternative modification of the seat shown in FIG. 6 to 9, with a seat pan 68 having a rear portion 70 with a flat upper surface which contains two recessed regions 72 and 74. As well as reducing the possibility of a seat occupant sliding down the seat when asleep, this relieves pressure on the under sides of the seat occupant's thighs at the junction between the top surface of the main portion 44 of the seat pan and the top surface of the rear portion 70.

Although the invention is particularly applicable to aircraft passenger seats, it may also be applied to seats for land, marine and amphibious vehicles.

I claim:

1. A vehicle seat comprising:

a base frame;

a seat back mounted on the base frame for angular movement between a substantially upright position and a reclined position;

a seat pan comprising a main portion having an upper surface and a rear portion having an upper surface, the rear portion being rigidly fixed to a rear edge of the main portion so that a rear edge of its upper surface is lower than the main portion upper surface when the main portion upper surface is horizontal; and seat pan mounting means supporting the seat pan on the base frame and for permitting change in orientation of the main portion between a normal substantially horizontal position in which the upper surface of the main portion is horizontal and the rear portion is stowed under the seat back, and a position in which the upper surface of the rear portion is horizontal and is located in front of the seat back.

2. A vehicle seat according to claim 1, wherein the rear portion of the seat pan has a concave upper surface.

3. A vehicle seat according to claim 1, wherein the seat pan mounting means comprise a guide track secured to the base frame and sliders secured to the seat pan and engaging in the guide track.

* * * * *